United States Patent
Nishimura et al.

(10) Patent No.: US 10,644,610 B2
(45) Date of Patent: May 5, 2020

(54) POWER CONVERSION DEVICE

(71) Applicant: TOSHIBA MITSUBISHI-ELECTRIC INDUSTRIAL SYSTEMS CORPORATION, Chuo-ku (JP)

(72) Inventors: Kazuki Nishimura, Chuo-ku (JP); Toshihide Nakano, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 16/342,816

(22) PCT Filed: Nov. 17, 2016

(86) PCT No.: PCT/JP2016/084083
§ 371 (c)(1),
(2) Date: Apr. 17, 2019

(87) PCT Pub. No.: WO2018/092239
PCT Pub. Date: May 24, 2018

(65) Prior Publication Data
US 2019/0260308 A1 Aug. 22, 2019

(51) Int. Cl.
*H02M 7/487* (2007.01)
*H02J 9/06* (2006.01)
(Continued)

(52) U.S. Cl.
CPC ............. *H02M 7/487* (2013.01); *H02J 9/062* (2013.01); *H02M 1/32* (2013.01); *H02M 3/1582* (2013.01); *H02M 5/4585* (2013.01); *H02M 7/48* (2013.01)

(58) Field of Classification Search
CPC ....... H02M 7/487; H02M 5/4585; H02J 9/062
See application file for complete search history.

(56) References Cited

U.S. PATENT DOCUMENTS 8,208,276 B2 * 6/2012 Sato .................. H02J 9/062
363/131
10,050,469 B2 * 8/2018 Nishimura ............... H02J 9/06
(Continued)

FOREIGN PATENT DOCUMENTS

| JP | 2003-70258 A | 3/2003 |
| JP | 2006-158060 A | 6/2006 |

(Continued)

OTHER PUBLICATIONS

International Search Report dated Feb. 7, 2017 in PCT/JP2016/084083 filed Nov. 17, 2016.

*Primary Examiner* — Kyle J Moody
(74) *Attorney, Agent, or Firm* — Oblon, McClelland, Maier & Neustadt, L.L.P.

(57) ABSTRACT

A first wire (WP1, WN1, WC1) is provided between a first converter unit (U1) and a DC bus line (PL4, NL4, CL4). A second wire (WP2, WN2, WC2) is provided between a second converter unit (U2) and a DC bus line (PL4, NL4, CL4). A third wire (WP3, WN3, WC3) is provided between a third converter unit (U3) and a DC bus line (PL4, NL4, CL4). A first fuse (FP1, FN1, FC1) is inserted in each of the first wire (WP1, WN1, WC1). A second fuse (FP2, FN2, FC2) is inserted in each of the second wire (WP2, WN2, WC2). A third fuse (FP3, FN3, FC3) is inserted in each of the third wire (WP3, WN3, WC3).

4 Claims, 8 Drawing Sheets

(51) Int. Cl.
*H02M 5/458* (2006.01)
*H02M 7/48* (2007.01)
*H02M 3/158* (2006.01)
*H02M 1/32* (2007.01)

(56) References Cited

U.S. PATENT DOCUMENTS

| | | | |
|---|---|---|---|
| 10,263,457 B2* | 4/2019 | Nishimura | H02J 9/06 |
| 2008/0197706 A1* | 8/2008 | Nielsen | H02J 1/102 |
| | | | 307/66 |
| 2011/0299307 A1* | 12/2011 | Sato | H02J 9/062 |
| | | | 363/34 |
| 2019/0214811 A1* | 7/2019 | Nishimura | H02H 7/1216 |

FOREIGN PATENT DOCUMENTS

| | | |
|---|---|---|
| JP | 2013-230027 A | 11/2013 |
| WO | WO 2010/095241 A1 | 8/2010 |

\* cited by examiner

POWER CONVERSION DEVICE

TECHNICAL FIELD

The present invention relates to a power conversion device.

BACKGROUND ART

Generally, a power conversion device used in an uninterruptible power supply apparatus or the like includes a converter configured to convert AC power from a commercial AC power supply into DC power and an inverter configured to convert DC power into AC power with a desired frequency and a desired voltage.

For example, WO 2010/095241 (PTL 1) discloses an uninterruptible power supply apparatus constituted by a power conversion device including a three-level converter and a three-level inverter. In the power conversion device, each of the three-level converter and the three-level inverter includes a plurality of semiconductor switching elements.

In the power conversion device described above, if one of a plurality of semiconductor switching elements is damaged and short-circuited, an overcurrent or an overvoltage may occur. In PTL 1, a fuse is connected between one terminal of each semiconductor switching element and a DC bus line (DC positive bus line, DC negative bus line or DC neutral bus line). Thus, if one of the semiconductor switching elements is short-circuited, the fuse is blown to interrupt the current path, and thereby, it is possible to prevent the overcurrent or the overvoltage from occurring.

CITATION LIST

Patent Literature

PTL 1: WO 2010/095241

SUMMARY OF INVENTION

Technical Problem

However, in the power conversion device described in PTL 1, since a fuse is provided in the current path between each semiconductor switching element and the DC bus line, when the three-level converter and the three-level inverter are normally operating, a current will constantly flow through the fuse. In order to prevent the fuse from being erroneously blown in normal working state, it is required that the fuse in PTL 1 should have a rated current value larger than the current flowing through the converter and the inverter.

As described above, if a fuse with a large rated current value is used, when a semiconductor switching element is short-circuited, the fuse will not be blown until the short-circuit current exceeds the rated current value. Thus, after a semiconductor switching element is short-circuited, a large short-circuit current will flow through the current path until the fuse is blown, which may cause damage to the other healthy semiconductor switching elements or diodes.

Further, in PTL 1, since a total of nine fuses are used in each of the three-level converter and the three-level inverter and each fuse has a large rated current value, the device may become large in size and expensive in cost.

Furthermore, in PTL 1, when the power conversion device is in operation, a large power loss may occur in each fuse, which lowers the efficiency of the power converter.

Therefore, the main object of the present invention is to provide a power conversion device capable of preventing an overcurrent or an overvoltage from occurring with a simple structure.

Solution to Problem

The power conversion device according to an aspect of the present invention is configured to convert a first-phase AC voltage, a second-phase AC voltage and a third-phase AC voltage supplied from an AC power supply into a fourth-phase AC voltage, a fifth-phase AC voltage and a sixth-phase AC voltage, respectively, and supply the same to a load. The power conversion device includes a first power converter configured to convert the first-phase AC voltage into the fourth-phase AC voltage, a second power converter configured to convert the second-phase AC voltage into the fifth-phase AC voltage, and a third power converter configured to convert the third-phase AC voltage into the sixth-phase AC voltage. The first power converter includes a first-phase converter configured to convert the first-phase AC voltage into a first DC voltage, a fourth-phase inverter configured to convert the first DC voltage supplied from the first-phase converter into the fourth-phase AC voltage, and a first DC positive bus line and a first DC negative bus line connected between the first-phase converter and the fourth-phase inverter. The second power converter includes a second-phase converter configured to convert the second-phase AC voltage into a second DC voltage, a fifth-phase inverter configured to convert the second DC voltage supplied from the second-phase converter into the fifth-phase AC voltage, and a second DC positive bus line and a second DC negative bus line connected between the second-phase converter and the fifth-phase inverter. The third power converter includes a third-phase converter configured to convert the third-phase AC voltage into a third DC voltage, a sixth-phase inverter configured to convert the third DC voltage supplied from the third-phase converter into the sixth-phase AC voltage, and a third DC positive bus line and a third DC negative bus line connected between the third-phase converter and the sixth-phase inverter. The power conversion device further includes a fourth DC positive bus line collectively connected by the first DC positive bus line, the second DC positive bus line and the third DC positive bus line, a fourth DC negative bus line collectively connected by the first DC negative bus line, the second DC negative bus line and the third DC negative bus line, a first fuse connected between the first DC positive bus line and the fourth DC positive bus line, a second fuse connected between the second DC positive bus line and the fourth DC positive bus line, a third fuse connected between the third DC positive bus line and the fourth DC positive bus line, a fourth fuse connected between the first DC negative bus line and the fourth DC negative bus line, a fifth fuse connected between the second DC negative bus line and the fourth DC negative bus line, and a sixth fuse connected between the third DC negative bus line and the fourth DC negative bus line.

Advantageous Effects of Invention

According to the present invention, it is possible for the power conversion device to prevent an overcurrent or an overvoltage from occurring with a simple structure.

DESCRIPTION OF EMBODIMENTS

Figure 1:
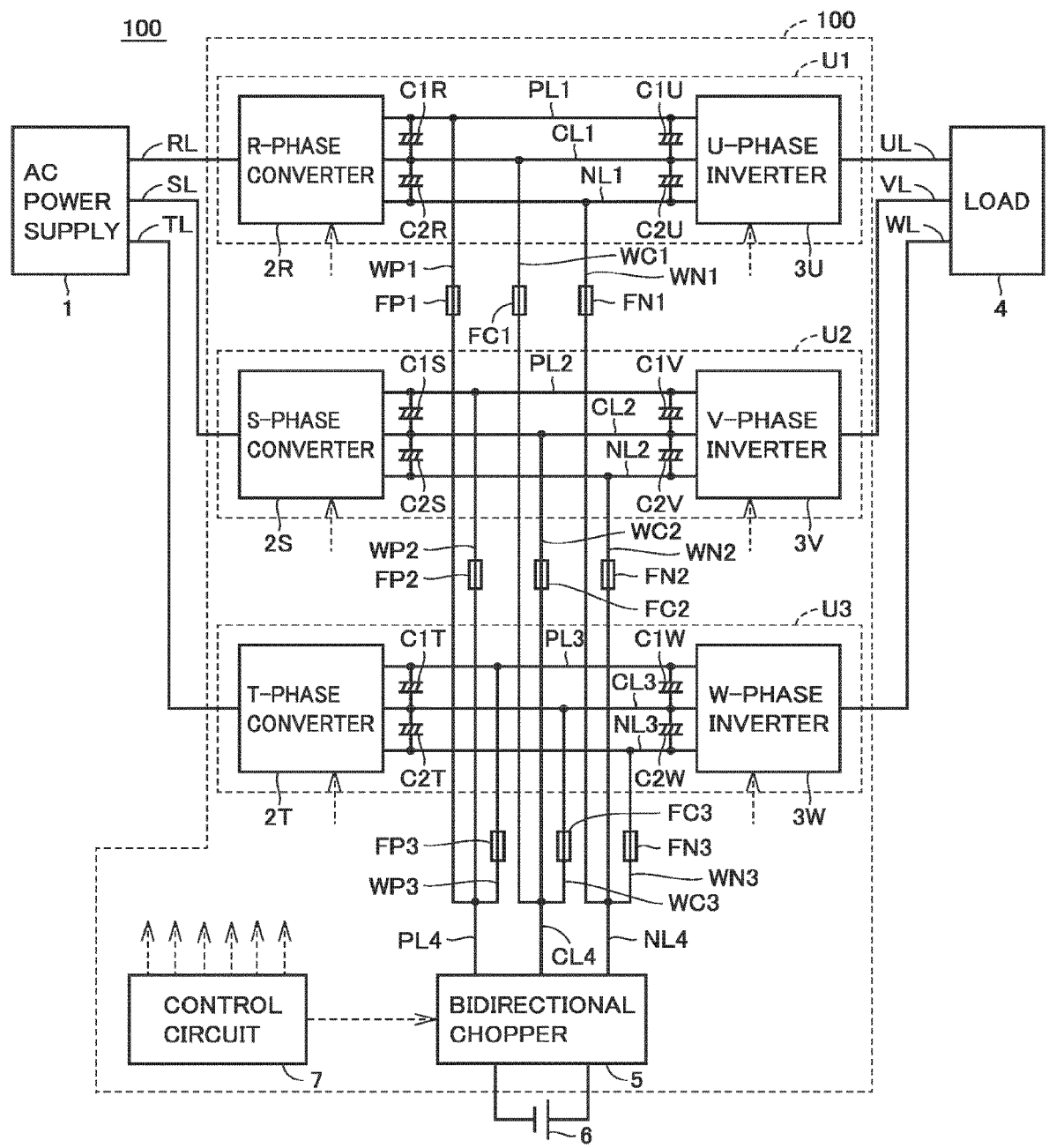
FIG. 1 is a schematic block diagram illustrating the configuration of a main circuit of a power conversion device according to an embodiment of the present invention.

Hereinafter, embodiments of the present invention will be described in detail with reference to the drawings. In the following description, the same or corresponding portions in the drawings will be denoted by the same reference numerals, and the description thereof will not be repeated.

FIG. 1 is a schematic block diagram illustrating the configuration of a main circuit of a power conversion device 100 according to an embodiment of the present invention. The power conversion device 100 according to the present embodiment is used in, for example, an uninterruptible power supply apparatus. An AC power supply 1 is configured to supply a three-phase AC power of commercial frequency to the power conversion device 100. A load 4 is driven by the three-phase AC power of commercial frequency supplied from the power conversion device 100.

With reference to FIG. 1, the power conversion device 100 includes three converter units U1 to U3 connected in parallel between the AC power supply 1 and the load 4, and a control circuit 7. The power conversion device 100 further includes wires WP1 to WP3, wires WN1 to WN3, wires WC1 to WC3, a DC positive bus line PL4, a DC negative bus line NL4, a DC neutral bus line CL4, and a bidirectional chopper 5.

The first converter unit U1 includes a R-phase converter 2R, a U-phase inverter 3U, a DC positive bus line PL1, a DC negative bus line NL1, a DC neutral bus line CL1, and capacitors C1R, C2R, C1U and C2U.

The AC power supply 1 supplies a R-phase voltage to the R-phase converter 2R via a R-phase line RL. The R-phase converter 2R converts the R-phase voltage VR into a DC voltage and supplies the DC voltage to the U-phase inverter 3U via the DC bus lines PL1, CL1 and NL1. The U-phase inverter 3U converts the DC voltage from the R-phase converter 2R into a U-phase voltage VU. The U-phase voltage VU generated by the U-phase inverter 3U is supplied to the load 4 via a U-phase line UL. The capacitors C1R and C1U are connected in parallel between the DC positive bus line PL1 and the DC neutral bus line CL1. The capacitors C2R and C2U are connected in parallel between the DC neutral bus line CL1 and the DC negative bus line NL1.

The second converter unit U2 includes an S-phase converter 2S, a V-phase inverter 3V, a DC positive bus line PL2, a DC negative bus line NL2, a DC neutral bus line CL2, and capacitors C1S, C2S, C1V and C2V.

The AC power supply 1 supplies an S-phase voltage to the S-phase converter 2S via an S-phase line SL. The S-phase converter 2S converts the S-phase voltage VS into a DC voltage and supplies the DC voltage to the V-phase inverter 3V via the DC bus lines PL2, CL2 and NL2. The V-phase inverter 3V converts the DC voltage from the S-phase converter 2S into a V-phase voltage VV. The V-phase voltage VV generated by the V-phase inverter 3V is supplied to the load 4 via a V-phase line VL. The capacitors C1S and C1V are connected in parallel between the DC positive bus line PL2 and the DC neutral bus line CL2. The capacitors C2S and C2V are connected in parallel between the DC neutral bus line CL2 and the DC negative bus line NL2.

The third converter unit U3 includes a T-phase converter 2T, a W-phase inverter 3W, a DC positive bus line PL3, a DC negative bus line NL3, a DC neutral bus line CL3, and capacitors C1T, C2T, C1W and C2W.

The AC power supply 1 supplies a T-phase voltage to the T-phase converter 2T via a T-phase line TL. The T-phase converter 2T converts the T-phase voltage VT into a DC voltage and supplies the DC voltage to the W-phase inverter 3W via the DC bus lines PL3, CL3 and NL3. The W-phase inverter 3W converts the DC voltage from the T-phase converter 2T into a W-phase voltage VW. The W-phase voltage VW generated by the W-phase inverter 3W is supplied to the load 4 via a W-phase line WL. The capacitors C1T and C1W are connected in parallel between the DC positive bus line PL3 and the DC neutral bus line CL3. The capacitors C2T and C2W are connected in parallel between the DC neutral bus line CL3 and the DC negative bus line NL3.

Thus, each of the converter units U1 to U3 is configured to include one single-phase converter, one single-phase inverter, three DC bus lines (a DC positive bus line, a DC negative bus line and a DC neutral bus line) and four capacitors.

The wires WP1, WN1 and WC1 are provided between the first converter unit U1 and each of the DC bus lines PL4, NL4 and CL4, respectively. Specifically, the wire WP1 is connected between the DC positive bus lines PL1 and PL4, the wire WN1 is connected between the DC negative bus lines NL1 and NL4, and the wire WC1 is connected between the DC neutral bus lines CL1 and CL4.

The wires WP2, WN2 and WC2 are provided between the second converter unit U2 and each of the DC bus lines PL4, NL4 and CL4, respectively. Specifically, the wire WP2 is connected between the DC positive bus lines PL2 and PL4, the wire WN2 is connected between the DC negative bus lines NL2 and NL4, and the wire WC2 is connected between the DC neutral bus lines CL2 and CL4.

The wires WP3, WN3 and WC3 are provided between the third converter unit U3 and each of the DC bus lines PL4, NL4 and CL4, respectively. Specifically, the wire WP3 is connected between the DC positive bus lines PL3 and PL4, the wire WN3 is connected between the DC negative bus lines NL3 and NL4, and the wire WC3 is connected between the DC neutral bus lines CL3 and CL4.

The bidirectional chopper 5 is connected between the DC power supply 6 and each of the DC positive bus line PL4, the DC negative bus line NL4 and the DC neutral bus line CL4. The bidirectional chopper 5 is configured to perform a bidirectional DC voltage conversion between the DC power supply 6 and each of the DC bus lines PL4, NL4 and CL4.

Figure 2:
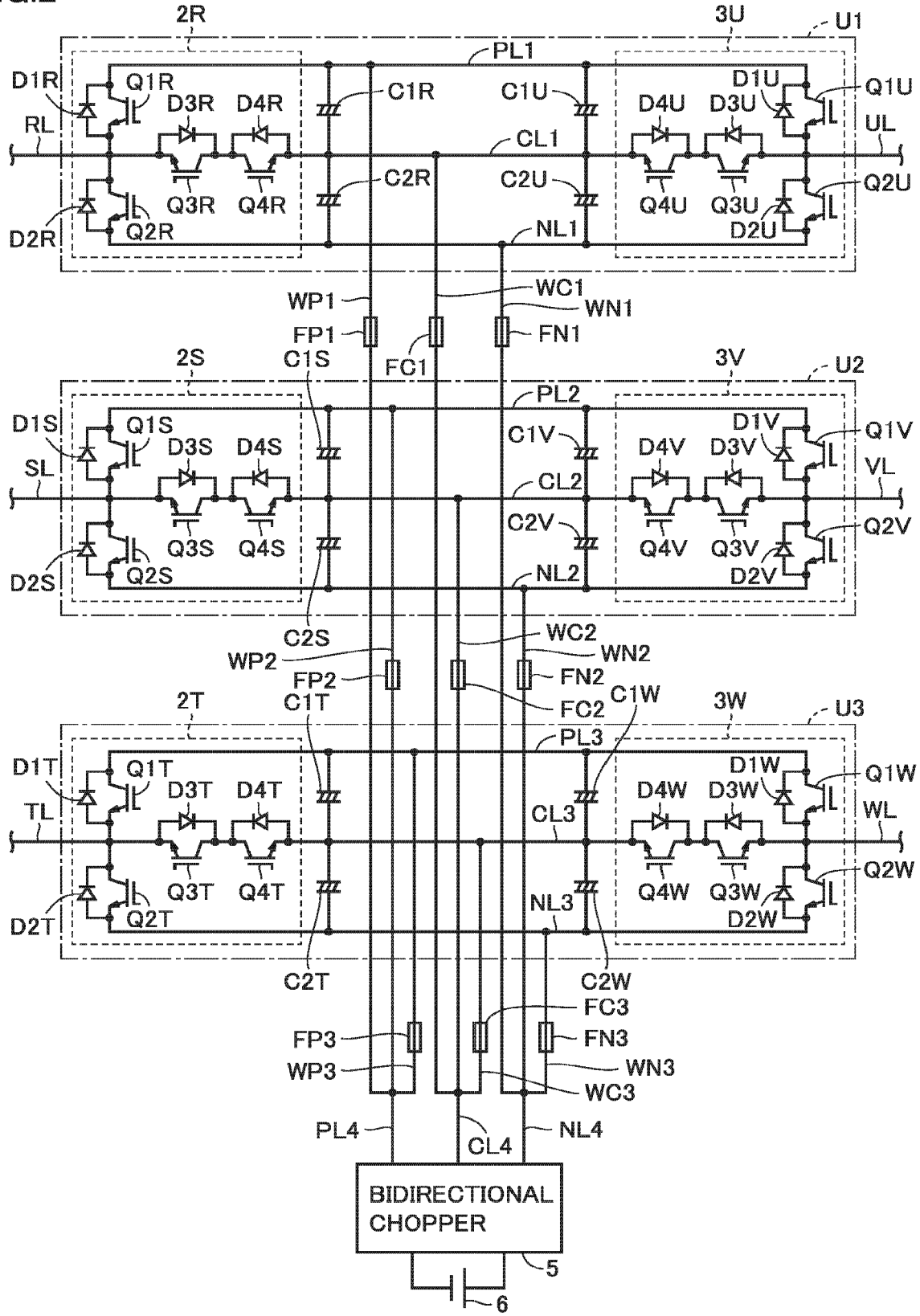
FIG. 2 is a circuit diagram illustrating in detail the configuration of a single-phase converter and a single-phase inverter illustrated in FIG. 1.

As illustrated in FIG. 2, the wires WP1, WP2 and WP3 are collectively connected to the DC positive bus line PL4. By connecting the wires WP1, WP2 and WP3 to each other via the DC positive bus line PL4, the DC positive bus lines PL1, PL2 and PL3 are connected to each other. Thereby, the voltage of the DC positive bus line PL1, the voltage of the DC positive bus line PL2, and the voltage of the DC positive bus line PL3 are equal to each other.

Further, the wires WN1, WN2 and WN3 are collectively connected to the DC negative bus line NL4. By connecting the wires WN1, WN2 and WN3 to each other via the DC negative bus line NL4, the DC negative bus lines NL1, NL2 and NL3 are connected to each other. Thereby, the voltage of the DC negative bus line NL1, the voltage of the DC negative bus line NL2, and the voltage of the DC negative bus line NL3 are equal to each other.

Furthermore, the wires WC1, WC2 and WC3 are collectively connected to the DC neutral bus line CL4. By connecting the wires WC1, WC2 and WC3 to each other via the DC neutral bus line CL4, the DC neutral bus lines CL1, CL2 and CL3 are connected to each other. Thereby, the voltage of the DC neutral bus line CL1, the voltage of the DC neutral bus line CL2, and the voltage of the DC neutral bus line CL3 are equal to each other.

With such a configuration, it is possible to make the input voltage of the single-phase inverter 3U in the converter unit U1, the input voltage of the single-phase inverter 3V in the converter unit U2, and the input voltage of the single-phase inverter 3W in the converter unit U3 equal to each other, and thereby the amplitudes of the phase voltages output from the single-phase inverters 3U, 3V and 3W are equal to each other.

Next, the operation of the power conversion device 100 according to the present embodiment will be described.

The three-phase AC power from the AC power supply 1 is supplied to the R-phase converter 2R, the S-phase converter 2S and the T-phase converter 2T via the R-phase line RL, the S-phase line SL and the T-phase line TL, respectively. The R-phase converter 2R, the S-phase converter 2S and the T-phase converter 2T constitute a three-phase converter. The three-phase converter converts the three-phase AC power supplied from the AC power supply 1 into DC power and supplies the DC power to the U-phase inverter 3U, the V-phase inverter 3V and the W-phase inverter 3W via the DC positive bus line, the DC negative bus line and the DC neutral bus line, respectively. The U-phase inverter 3U, the V-phase inverter 3V and the W-phase inverter 3W constitute a three-phase inverter. The three-phase inverter converts the DC power supplied via the DC positive bus line, the DC negative bus line and the DC neutral bus line into three-phase AC power. The three-phase AC power generated by the three-phase inverter is supplied to the load 4 via the U-phase line UL, the V-phase line VL and the W-phase line WL.

In the normal state when the three-phase AC power is being supplied from the AC power supply 1, the bidirectional chopper 5 charges the DC power supply 6 by stepping down the DC voltage between the DC bus lines PL4 and CL4 and the DC voltage between the DC bus lines CL4 and NL4, respectively and supplying the stepped voltage to the DC power supply 6. In a power outage when the supply of the three-phase AC voltage from the AC power supply 1 is interrupted, the bidirectional chopper 5 discharges the DC power supply 6 by boosting the terminal voltage of the DC power supply 6 and supplying the boosted voltage to the DC bus lines PL4 and CL4 and to the DC bus lines CL4 and NL4.

The control circuit 7 controls the operation of the three-phase converter (constituted by the single-phase converters 2R, 2S and 2T), the three-phase inverter (constituted by the single-phase inverters 3U, 3V and 3W) and the bidirectional chopper 5 based on the three-phase AC voltage supplied from the AC power supply 1, the DC voltage of each of the DC bus lines PL4, NL4 and CL4, the terminal voltage of the DC power supply 6, the three-phase AC voltage output from the three-phase inverter (constituted by the single-phase inverters 3U, 3V and 3W), and the three-phase AC current (load current) flowing through the load 4.

FIG. 2 is a circuit diagram illustrating in detail the configuration of the single-phase converters 2R, 2S, 2T and the single-phase inverters 3U, 3V, 3W illustrated in FIG. 1.

With reference to FIG. 2, the R-phase converter 2R includes IGBT elements Q1R to Q4R and diodes D1R to D4R. The S-phase converter 2S includes IGBT elements Q1S to Q4S and diodes D1S to D4S. The T-phase converter 2T includes IGBT elements Q1T to Q4T and diodes D1T to D4T. The U-phase inverter 3U includes IGBT elements Q1U to Q4U and diodes D1U to D4U. The V-phase inverter 3V includes IGBT elements Q1V to Q4V and diodes D1V to D4V. The W-phase inverter 3W includes IGBT elements Q1W to Q4W and diodes D1W to D4W.

In order to explain the configuration of the single-phase converters 2R, 2S, 2T and the single-phase inverters 3U, 3V, 3W collectively, the symbols R, S, T, U, V and W are collectively denoted by "x", the DC positive bus lines PL1, PL2 and PL3 are collectively denoted by "PLi", the DC negative bus lines NL1, NL2 and NL3 are collectively denoted by "NLi", and the DC neutral bus lines CL1, CL2 and CL3 are collectively denoted by "CLi".

The emitter of the IGBT element Q1$x$ is connected to the x-phase line xL, and the collector thereof is connected to the DC positive bus line PLi. The collector of the IGBT element Q2$x$ is connected to the x-phase line xL, and the emitter thereof is connected to the DC negative bus line NLi. The emitter of the IGBT element Q3$x$ is connected to the x-phase line xL, and the collector thereof is connected to the collector of the IGBT element Q4$x$. The emitter of the IGBT element Q4$x$ is connected to the DC neutral bus line CLi. The diodes D1$x$ and D2$x$ function as freewheel diodes, and the diodes D3$x$ and D4$x$ function as clamp diodes. The IGBT elements Q3$x$ and Q4$x$ and the diodes D3$x$ and D4$x$ constitute an AC switch.

Figure 3:
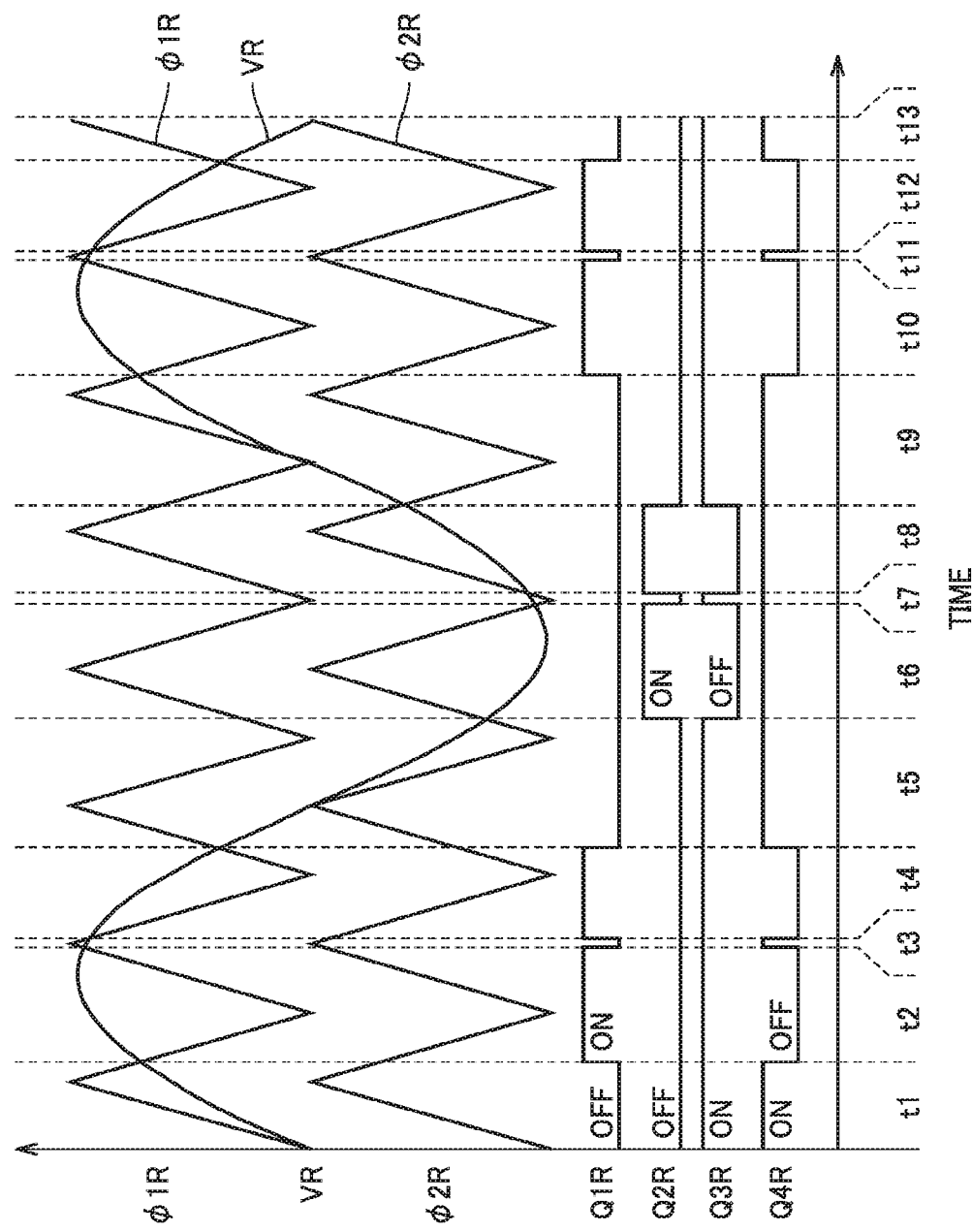
FIG. 3 is a waveform diagram illustrating ON/OFF timing of the IGBT elements illustrated in FIG. 2.

Next, the operation of the single-phase converters 2R, 2S, 2T and the single-phase inverters 3U, 3V, 3W will be described. FIG. 3 is a waveform diagram illustrating the relationship between the R-phase voltage VR and the on/off of the IGBT elements Q1R to Q4R. The R-phase voltage VR and reference signals φ1R, φ2R are compared in level, and the on/off of each of the IGBT elements Q1R to Q4R is determined based on the comparison result.

Each of the reference signals φ1R and φ2R is a triangular wave signal having a frequency five times of the frequency of the R-phase voltage VR and a phase same as the R-phase voltage VR. The reference signal φ2R is a triangular wave signal having the same phase as the reference signal φ1R.

As illustrated in FIG. 3, during the periods (t1, t3, t5, t7, t9, t11, t13) in which the level of the R-phase voltage VR is between the level of the reference signal φ1R and the level of the reference signal φ2R, the IGBT elements Q3R and Q4R are turned on, and the IGBT elements Q1R and Q2R are turned off. During the periods (t2, t4, t10, t12) in which the level of the R-phase voltage Vr is higher than both the level of the reference signal φ1R and the level of the reference signal φ2R, the IGBT elements Q1R and Q3R are turned on, and the IGBT elements Q2R and Q4R are turned off. During the periods (t6, t8) in which the level of the R-phase voltage Vr is lower than both the level of the reference signal φ1R and the level of the reference signal φ2R, the IGBT elements Q2R and Q4R are turned on, and the IGBT elements Q1R and Q3R are turned off. Note that the S-phase circuit, the T-phase circuit, the U-phase circuit, the V-phase circuit, and the W-phase circuit also operate in the same manner as the R-phase circuit.

With reference to FIG. 1 and FIG. 2 again, the power conversion device 100 further includes fuses FP1 to FP3, FN1 to FN3 and FC1 to FC3.

The fuse FP1 is inserted in the wire WP1, and is blown when an overcurrent flows through the wire WP1. The fuse FN1 is inserted in the wire WN1, and is blown when an overcurrent flows through the wire WN1. The fuse FC1 is inserted in the wire WC1, and is blown when an overcurrent flows through the wire WC1.

The fuse FP2 is inserted in the wire WP2, and is blown when an overcurrent flows through the wire WP2. The fuse FN2 is inserted in the wire WN2, and is blown when an overcurrent flows through the wire WN2. The fuse FC2 is inserted in the wire WC2, and is blown when an overcurrent flows through the wire WC2.

The fuse FP3 is inserted in the wire WP3, and is blown when an overcurrent flows through the wire WP3. The fuse FN3 is inserted in the wire WN1, and is blown when an overcurrent flows through the wire WN3. The fuse FC3 is inserted in the wire WC3, and is blown when an overcurrent flows through the wire WC3.

Hereinafter, the operation of the fuses FP1 to FP3, FN1 to FN3 and FC1 to FC3 will be described.

Figure 4:
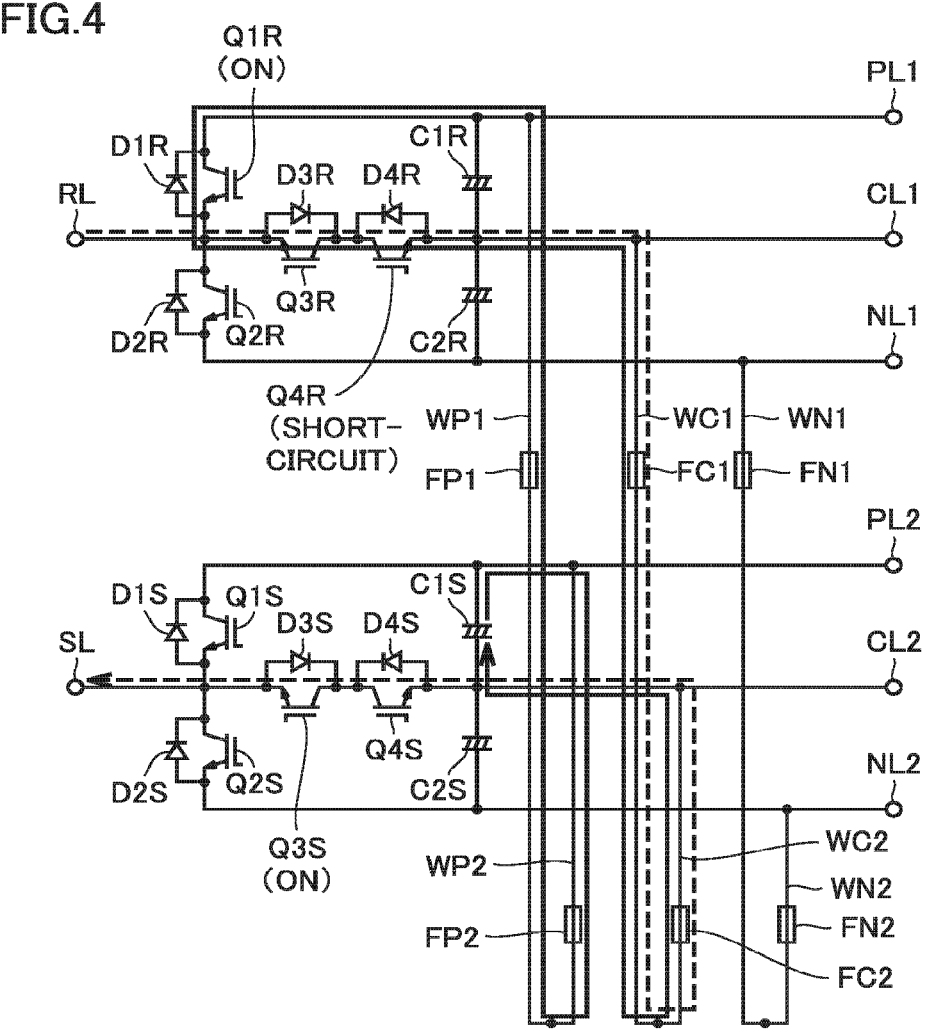
FIG. 4 is a circuit diagram illustrating the operation of the fuses illustrated in FIG. 2.

FIG. 4 is a diagram illustrating a case where the IGBT element Q4R fails and becomes short-circuited during the period when the IGBT elements Q1R and Q3S are turned on. In this case, as indicated by the dashed arrow in the figure, a short-circuit current flows from the R-phase line RL through the diode D3R, the IGBT element Q4R, the wire WC1, the wire WC2, the diode D4S and the IGBT element Q3S to the S-phase line SL, whereby the fuses FC1 and FC2 are blown. Further, as indicated by the solid arrow in the figure, a short-circuit current flows from the positive electrode of the capacitor C1S through the wire WP2, the wire WP1, the IGBT element Q1R, the diode D3R, the IGBT element Q4R, the wire WC1 and the wire WC2 to the negative electrode of the capacitor C1S, whereby the fuses FP1, FP2, FC1 and FC2 are blown.

Figure 5:
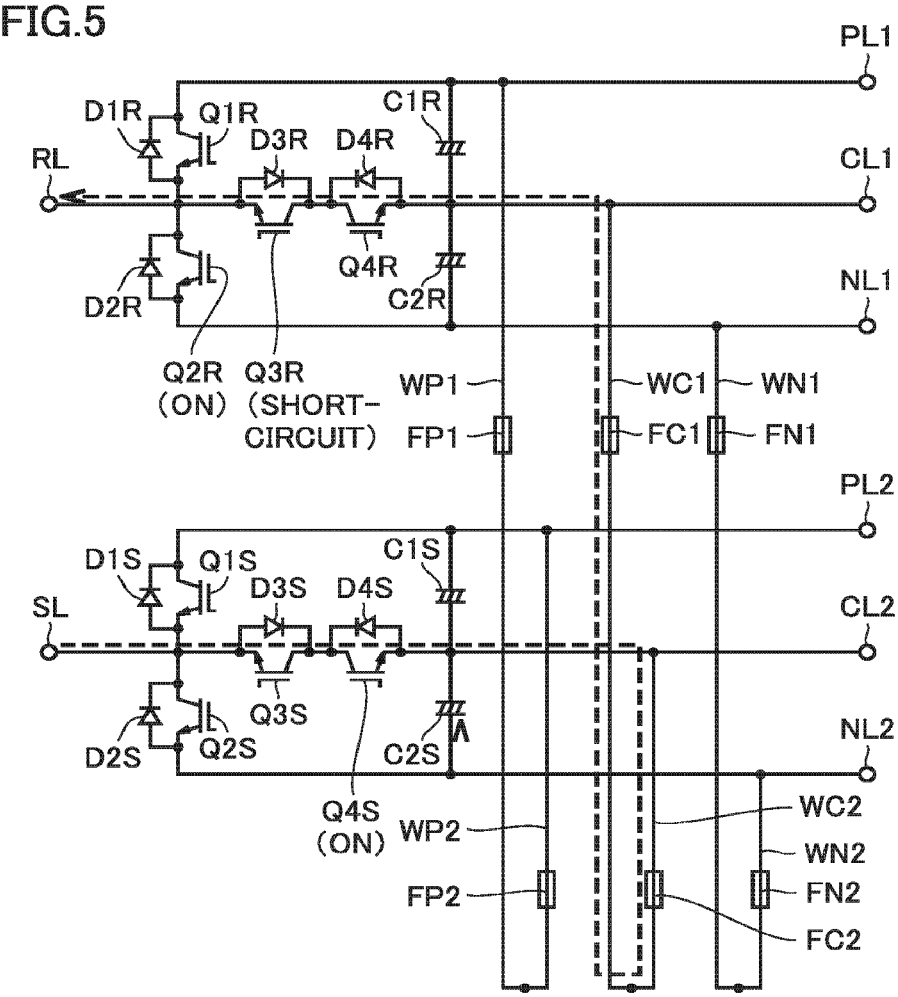
FIG. 5 is a circuit diagram illustrating the operation of the fuses illustrated in FIG. 2.

FIG. 5 is a diagram illustrating a case where the IGBT element Q3R fails and becomes short-circuited during the period when the IGBT elements Q2R and Q4S are turned on. In this case, as indicated by the dashed arrow in the figure, a short-circuit current flows from the S-phase line SL through the diode D3S, the IGBT element Q4S, the wire WC2, the wire WC1, the diode D4R, and the IGBT element Q3R to the R-phase line RL, whereby the fuses FC1 and FC2 are blown. Also, a short-circuit current flows from the positive electrode of the capacitor C2S through the wire WC2, the wire WC1, the diode D4R, the IGBT element Q3R, the IGBT element Q2R, the wire WN1 and the wire WN2 to the negative electrode of the capacitor C2S, whereby the fuses FC1, FC2, FN1 and FN2 are blown.

Figure 6:
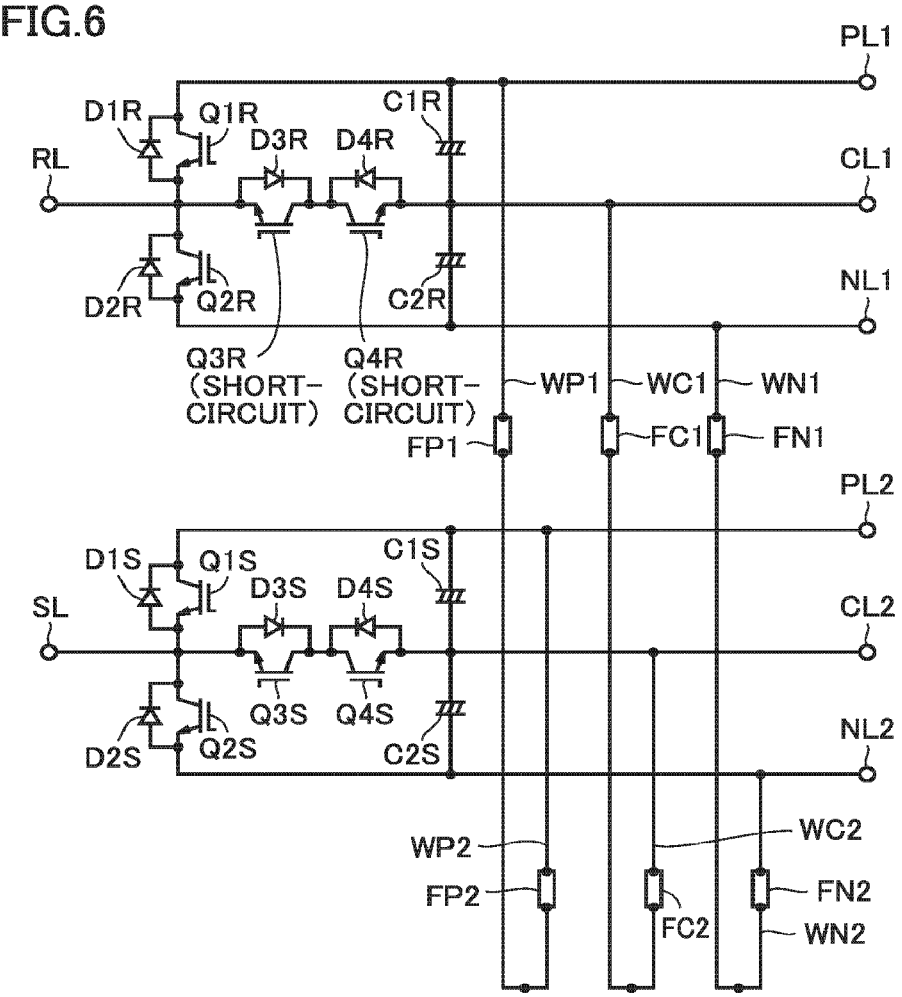
FIG. 6 is a circuit diagram illustrating the operation of the fuses illustrated in FIG. 2.

FIG. 6 is a diagram illustrating a case where the IGBT elements Q3R and Q4R fails and becomes short-circuited. As illustrated in FIGS. 4 and 5, since the fuses FP1, FP2, FC1, FC2, FN1 and FN2 are blown, the R-phase and the S-phase are completely separated. Thereby, it is possible to prevent the overcurrent or the overvoltage from occurring. In the above, the R-phase and the S-phase are described as an example with reference to FIGS. 4 to 6, the same applies to the other phases (T-phase, U-phase, V-phase, W-phase).

[Effect of the Present Embodiment]

Next, the effect of the power conversion device according to the present embodiment will be described in comparison with a power conversion device according to a comparative example.

Figure 7:
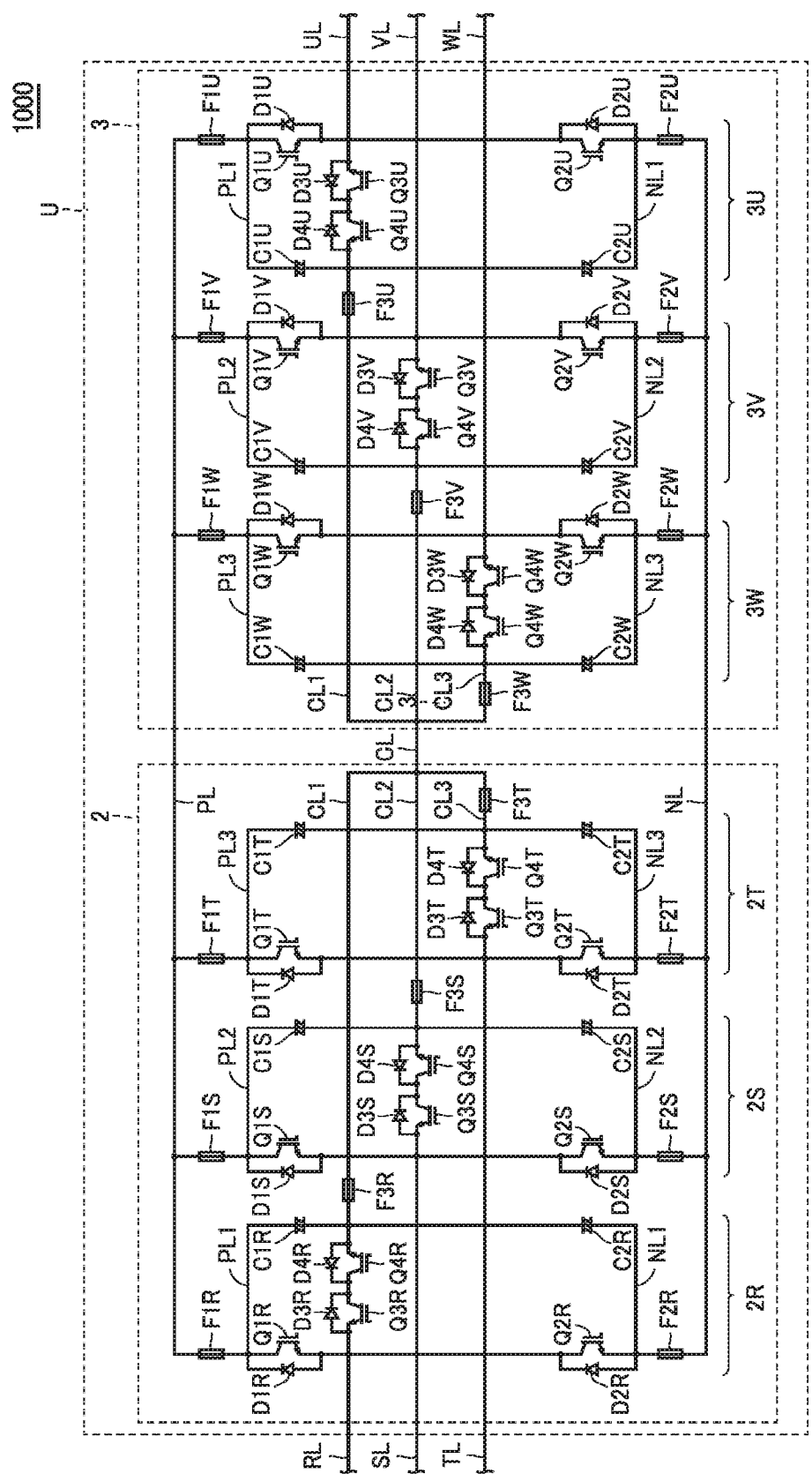
FIG. 7 is a circuit diagram illustrating the configuration of a power conversion device according to a comparative example.

FIG. 7 is a circuit diagram illustrating the configuration of a power conversion device 1000 according to a comparative example. The power conversion device 1000 according to the comparative example is equivalent to the power conversion device described above in PTL 1. Basically, the power conversion device 1000 according to the comparative example is the same as the power conversion device 100 according to the present embodiment illustrated in FIG. 1 on the basic structure constituted by the converter and the inverter but different on the configuration of the converter unit.

With reference to FIG. 7, the power conversion device 1000 according to the comparative example includes one converter unit U connected between an AC power supply 1 and a load 4 (both not shown). The converter unit U includes a three-phase converter 2, a three-phase inverter 3, a DC positive bus line PL, a DC negative bus line NL and a DC neutral bus line CL.

The three-phase converter 2 is constituted by connecting the R-phase converter 2R, the S-phase converter 2S and the T-phase converter 2T illustrated in FIGS. 1 and 2 in parallel between the DC positive bus line PL and the DC negative bus line NL. In this configuration, the DC neutral bus line of each phase converter is collectively connected to the DC neutral bus line CL.

The three-phase inverter 3 is constituted by connecting the U-phase inverter 3U, the V-phase inverter 3V and the W-phase inverter 3W illustrated in FIGS. 1 and 2 in parallel between the DC positive bus line PL and the DC negative bus line NL. In this configuration, the DC neutral bus line of each phase inverter is collectively connected to the DC neutral bus line CL. The operation of the three-phase converter 2 is substantially the same as the operation of the single-phase converters 2R, 2S, 2T described with reference to FIG. 3, and the operation of the three-phase inverter 3 is substantially the same as the operation of the single-phase inverters 3U, 3V, 3W described with reference to FIG. 3.

The power conversion device 1000 according to the comparative example further includes fuses F1R to F3R, F1S to F3S, F1T to F3T, F1U to F3U, F1V to F3V and F1W to F3W. In order to explain the configuration of these fuses collectively, the symbols R, S, T, U, V and W are collectively denoted by "x".

The fuse F1x is connected between the collector of the IGBT element Q1x and the DC positive bus line PL. The fuse F2x is connected between the emitter of the IGBT element Q2x and the DC negative bus line NL. The fuse F3x is connected between the emitter of the IGBT element Q4x and the DC neutral bus line CLx.

As described above in PTL 1, in the power conversion device 1000 according to the comparative example, for example, in the case where the IGBT element Q4R fails and becomes short-circuited during the period when the IGBT elements Q1R and Q3S are turned on, a short-circuit current flows from the R-phase line RL through the diode D3R, the IGBT element Q4R, the fuse F3R, the fuse F3S, the diode D4S, and the IGBT element Q3S to the S-phase line SL, whereby the fuses F3R and F3S are blown. Further, a short-circuit current flows from the positive electrode of the capacitor C1S through the fuse F1S, the fuse F1R, the IGBT element Q1R, the diode D3R, the IGBT element Q4R, the fuse F3R and the fuse F3S to the negative electrode of the capacitor C1S, whereby the fuses F1S, F1R, F3R and F3S are blown.

Thus, in the power conversion device 1000 according to the comparative example, when the IGBT element fails and becomes short-circuited, the fuses are blown, and thereby, the failed phase and the normal phase are separated from each other so as to prevent an overcurrent or an overvoltage from occurring.

However, in the power conversion device 1000 according to the comparative example, each fuse is inserted in the current path of the three-phase converter 2 and the three-phase inverter 3 both in operation. Therefore, in order to prevent the fuse from being blown when the three-phase converter 2 and the three-phase inverter 3 are in normal operation, it is required to use a fuse having a rated current value higher than the maximum value of the current flowing through the current path. In the specification of the present application, the rated current value of a fuse refer to the value of a current that will not blow out the fuse when flowing through the fuse regularly.

In the power conversion device 1000 according to the comparative example, all of the nine fuses must have a high rated current value. When a fuse with a high rated current value is used, the fuse will not be blown until an overcurrent exceeds the rated current value. Thus, an overcurrent will flow through the current path after the failure until the fuse is blown. Therefore, the other healthy IGBT elements may be damaged by the overcurrent or the overvoltage until the fuse is blown.

Further, since several fuses having a high rated current value are used, the converter unit U may become large in size and expensive in cost.

Furthermore, in the power conversion device 1000 according to the comparative example, since the IGBT elements and the fuses are electrically connected in series, when an IGBT element performs a switching operation, a high surge voltage generated by the reactor component of a fuse may be applied to the IGBT element. Thus, it is required to prevent the IGBT element from being damaged by the surge voltage.

Further, since each fuse is inserted in the current path of the three-phase converter 2 and the three-phase inverter 3 both in operation, a power loss may occur due to the resistance component of each fuse, which may lower the efficiency of the power conversion device 1000.

By contrast, in the power conversion device 100 according to the present embodiment, when the single-phase converter and the single-phase inverter in each of the converter units U1 to U3 are in normal operation, the voltages of the DC positive bus lines PL1, PL2 and PL3 between each of the converter units U1 to U3 are equal to each other. Similarly, the voltages of the DC negative bus lines NL1, NL2 and NL3 are equal to each other, and the voltages of the DC neutral bus lines CL1, CL2 and CL3 are equal to each other. In addition, even if the voltages of the DC positive bus lines PL1, PL2 and PL3 are slightly changed by a slight blur in the operation of the single-phase converter and the single-phase inverter, a small current (which is smaller than the rated current value of the fuse) flows through the wires WP1, WP2 and WP3, whereby the voltages of the DC positive bus lines PL1, PL2, and PL3 are equal to each other. The same applies to the DC negative bus lines NL1, NL2 and NL3 and the DC neutral bus lines CL1, CL2 and CL3.

On the other hand, as illustrated in FIGS. 4 and 5, when an IGBT element in one of the converter units U1 to U3 fails and becomes short-circuited, a current will flow through the wires WP1, WP2, WP3, WN1, WN2, WN3, WC1, WC2, and WC3, and thereby the fuse is blown so as to prevent an overcurrent or an overvoltage from occurring.

In other words, in the power conversion device 100 according to the present embodiment, it is not required to consider the current flowing through the fuse during the normal operation, it is only required to ensure that the fuse will be blown when a current resulted from a failure flows through the wire. Therefore, compared with the fuse used in the power conversion device 1000 according to the comparative example, it is possible to use a fuse having a lower rated current value.

Thus, after the failure, the fuse is blown before a current larger than the normal current flows through the converter, the inverter and the like, which makes it possible to protect the power conversion device 100 from being damaged by the overcurrent or the overvoltage.

Further, according to the power conversion device 100 of the present embodiment, the number of fuses may be reduced as compared with the power conversion device 1000 according to the comparative example. According to the present embodiment, the number of fuses may be halved. Therefore, according to the present embodiment, the power conversion device 100 may be made smaller in size and cheaper in cost.

Furthermore, when each of the converter units U1 to U3 is in normal operation, no current will flow through the fuse, and thereby no power loss is caused by the fuse. Therefore, according to the present embodiment, it is possible to improve the efficiency of the power conversion device 100.

Figure 8:
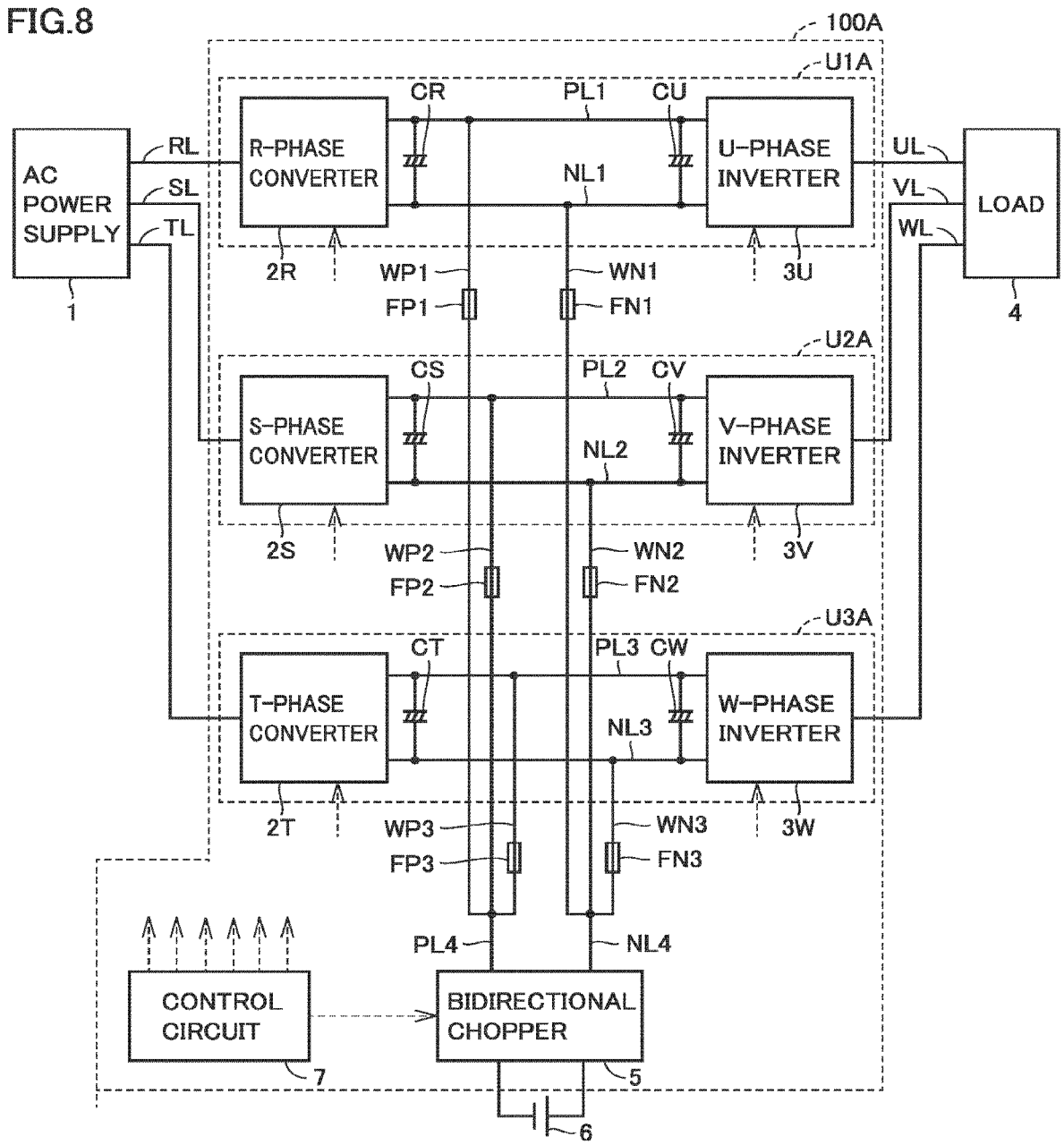
FIG. 8 is a schematic block diagram illustrating the configuration of a main circuit of a power conversion device according to a modified example of the present invention.

In the above-described embodiment, it is described that each of the single-phase converters 2R, 2S, 2T is a three-level converter, and each of the single-phase inverters 3U, 3V, 3W is a three-level inverter. However, each single-phase converter may be a two-level converter, and each single-phase inverter may be a two-level inverter. FIG. 8 is a circuit diagram illustrating the configuration of a power conversion device 100A according to a modified example of the present invention. As illustrated in FIG. 8, each converter unit includes two DC bus lines (a DC positive bus line and a DC negative bus line) and two capacitors connected in parallel between two DC bus lines. In the present modified example, when an IGBT element in one of the single-phase converter and the single-phase inverter fails and becomes short-circuited, the fuse is blown, and thereby, the same effect as in the embodiment may be obtained.

In above-described embodiment and the modified example, the first converter unit, the second converter unit and the third converter unit correspond respectively to the first power converter, the second power converter and the third power converter, the R-phase converter, the S-phase converter and the T-phase converter correspond respectively to the first-phase converter, the second-phase converter and the third-phase converter of the present invention, the U-phase inverter, the V-phase inverter and the W-phase inverter correspond respectively to the fourth-phase inverter, the fifth-phase inverter and the sixth-phase inverter of the present invention, the DC positive bus lines PL1 to PL4 correspond respectively to the first to fourth DC positive bus lines in the present invention, the DC negative bus lines CL1 to CL4 correspond respectively to the first to fourth DC negative bus lines of the present invention, and the DC neutral bus lines NL1 to NL4 correspond respectively to the first to fourth DC neutral bus lines of the present invention.

The embodiments disclosed herein are merely by way of example and not limited thereto. The scope of the present invention is defined by the terms of the claims, rather than the description above, and is intended to include any modifications within the meaning and scope equivalent to the terms of the claims.

REFERENCE SIGNS LIST

2: converter; 2R: R-phase converter; 2S: S-phase converter; 2T: T-phase converter; 3: inverter; 3U: U-phase inverter; 3V: V-phase inverter; 3W: W-phase inverter; 5: bidirectional chopper; 6: DC power supply; Q1R-Q4R, Q1S-Q4S, Q1T-Q4T, Q1U-Q4U, Q1V-Q4V, Q1W-Q4W: IGBT element; D1R-D4R, D1S-D4S, D1T-D4T, D1U-D4U, D1V-D4V, D1W-D4W: diode; 100, 1000: power conversion device; PL, PL1-PL4: DC positive bus line; NL, NL1-NL4: DC negative bus line; CL, CL1-CL4: DC neutral bus line; C1R, C1S, C1T, C2R, C2S, C2T, C3R, C3S, C3T, C1U, C1V, C1W, C2U, C2V, C2W, C3U, C3V, C3W: capacitor; WP1-WP3, WN1-WN3, WC1-WC3: wire; FP1-FP3, FN1-FN3, FC1-FC3: fuse

The invention claimed is:

1. A power conversion device configured to convert a first-phase AC voltage, a second-phase AC voltage and a third-phase AC voltage supplied from an AC power supply into a fourth-phase AC voltage, a fifth-phase AC voltage, and a sixth-phase AC voltage, respectively, and supply the fourth-phase AC voltage, the fifth-phase AC voltage, and the sixth-phase AC voltage to a load, the power conversion device comprising:
   a first power converter configured to convert the first-phase AC voltage into the fourth-phase AC voltage;
   a second power converter configured to convert the second-phase AC voltage into the fifth-phase AC voltage; and
   a third power converter configured to convert the third-phase AC voltage into the sixth-phase AC voltage,
   the first power converter including:
      a first-phase converter configured to convert the first-phase AC voltage into a first DC voltage;
      a fourth-phase inverter configured to convert the first DC voltage supplied from the first-phase converter into the fourth-phase AC voltage;
      a first DC positive bus line and a first DC negative bus line connected between the first-phase converter and the fourth-phase inverter; and
      a first capacitor connected between the first DC positive bus line and the first DC negative bus line,
   the second power converter including:
      a second-phase converter configured to convert the second-phase AC voltage into a second DC voltage;
      a fifth-phase inverter configured to convert the second DC voltage supplied from the second-phase converter into the fifth-phase AC voltage;
      a second DC positive bus line and a second DC negative bus line connected between the second-phase converter and the fifth-phase inverter; and
      a second capacitor connected between the second DC positive bus line and the second DC negative bus line,
   the third power converter including:
      a third-phase converter configured to convert the third-phase AC voltage into a third DC voltage;
      a sixth-phase inverter configured to convert the third DC voltage supplied from the third-phase converter into the sixth-phase AC voltage;
      a third DC positive bus line and a third DC negative bus line connected between the third-phase converter and the sixth-phase inverter; and
      a third capacitor connected between the third DC positive bus line and the third DC negative bus line, and
   the power conversion device further comprising:
      a fourth DC positive bus line collectively connected by the first DC positive bus line, the second DC positive bus line, and the third DC positive bus line;
      a fourth DC negative bus line collectively connected by the first DC negative bus line, the second DC negative bus line, and the third DC negative bus line;
      a first fuse connected between the first DC positive bus line and the fourth DC positive bus line;
      a second fuse connected between the second DC positive bus line and the fourth DC positive bus line;
      a third fuse connected between the third DC positive bus line and the fourth DC positive bus line;
      a fourth fuse connected between the first DC negative bus line and the fourth DC negative bus line;
      a fifth fuse connected between the second DC negative bus line and the fourth DC negative bus line; and
      a sixth fuse connected between the third DC negative bus line and the fourth DC negative bus line.

2. The power conversion device according to claim 1, further comprising a DC voltage converter provided between a DC power supply and each of the fourth DC positive bus line and the fourth DC negative bus line, and the DC voltage converter configured to perform a bidirectional DC voltage conversion between the DC power supply and each of the fourth DC positive bus line and the fourth DC negative bus line.

3. The power conversion device according to claim 1, wherein
   each of the first-phase converter, the second-phase converter and the third-phase converter is a three-level converter,
   each of the fourth-phase inverter, the fifth-phase inverter and the sixth-phase inverter is a three-level inverter,
   the first power converter further includes a first DC neutral bus line connected between the first-phase converter and the fourth-phase inverter,
   the second power converter further includes a second DC neutral bus line connected between the second-phase converter and the fifth-phase inverter,
   the third power converter further includes a third DC neutral bus line connected between the third-phase converter and the sixth-phase inverter, and
   the power conversion device further includes:
      a fourth DC neutral bus line collectively connected by the first DC neutral bus line, the second DC neutral bus line, and the third DC neutral bus line;
      a seventh fuse connected between the first DC neutral bus line and the fourth DC neutral bus line;
      an eighth fuse connected between the second DC neutral bus line and the fourth DC neutral bus line; and
      a ninth fuse connected between the third DC neutral bus line and the fourth DC neutral bus line.

4. The power conversion device according to claim 3, further comprising a DC voltage converter provided between a DC power supply and each of the fourth DC positive bus line, the fourth DC negative bus line and the fourth DC neutral bus line, and the DC voltage converter configured to perform a bidirectional DC voltage conversion between the DC power supply and each of the fourth DC positive bus line, the fourth DC negative bus line and the fourth DC neutral bus line.

\* \* \* \* \*